US010824166B2

(12) United States Patent
Hsu et al.

(10) Patent No.: US 10,824,166 B2
(45) Date of Patent: Nov. 3, 2020

(54) METHODS AND SYSTEMS OF DISTRIBUTING TASK REGIONS FOR A PLURALITY OF CLEANING DEVICES

(71) Applicant: Quanta Computer Inc., Taoyuan (TW)

(72) Inventors: Tao-Chih Hsu, Taoyuan (TW);
Yang-Sheng Wang, Taoyuan (TW);
Chun-Ting Chen, Taoyuan (TW);
Yu-Ching Chen, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 72 days.

(21) Appl. No.: 16/410,193

(22) Filed: May 13, 2019

(65) Prior Publication Data

US 2020/0125115 A1     Apr. 23, 2020

(30) Foreign Application Priority Data

Oct. 23, 2018 (TW) .............................. 107137349 A

(51) Int. Cl.
*G05D 1/02* (2020.01)
(52) U.S. Cl.
CPC ......... *G05D 1/0287* (2013.01); *G05D 1/0219* (2013.01); *G05D 2201/0203* (2013.01)
(58) Field of Classification Search
CPC ............... G05D 1/0219; G05D 1/0287; G05D 2201/0203
See application file for complete search history.

(56) References Cited

U.S. PATENT DOCUMENTS

| 5,247,608 | A  | * | 9/1993 | Flemming | B25J 9/1676 |
| | | | | | 700/255 |
| 6,389,329 | B1 | * | 5/2002 | Colens | A47L 5/30 |
| | | | | | 700/262 |
| 6,690,134 | B1 | * | 2/2004 | Jones | A47L 9/009 |
| | | | | | 318/567 |
| 7,388,343 | B2 | * | 6/2008 | Jones | G05D 1/0219 |
| | | | | | 318/568.12 |
| 7,389,156 | B2 | * | 6/2008 | Ziegler | A22C 17/0013 |
| | | | | | 318/568.1 |
| 8,639,364 | B2 | * | 1/2014 | Stoddard | B25J 9/1669 |
| | | | | | 700/14 |
| 9,278,452 | B2 | * | 3/2016 | Brandenberger | G05B 19/4061 |

(Continued)

*Primary Examiner* — Babar Sarwar
(74) *Attorney, Agent, or Firm* — McClure, Qualey & Rodack, LLP

(57) ABSTRACT

A method of distributing task regions for a plurality of cleaning devices, including: dividing a task map into a plurality of basic sub-regions according to concave corners corresponding to the shape of the task map; combining each two adjacent basic sub-regions, and calculating basic cleaning time corresponding to each of the combined basic sub-regions; repeatedly combining each two adjacent basic sub-regions according to the basic cleaning time, and obtaining a basic partition result; selecting starting blocks according to positions of the plurality of task sub-regions in the basic partitioning result; combining the task sub-regions according to the position of each starting block, the position of each task sub-region, and the cleaning time corresponding to each task sub-region, and obtaining the task region distribution result; enabling cleaning devices to perform cleaning tasks according to the position of each cleaning device and the task region distribution result.

10 Claims, 19 Drawing Sheets

(56) References Cited

U.S. PATENT DOCUMENTS

| | | | |
|---|---|---|---|
| 9,329,593 B2* | 5/2016 | Izumi | G05B 19/41815 |
| 9,707,681 B2* | 7/2017 | Davidi | B25J 9/1682 |
| 10,168,709 B2* | 1/2019 | Kleiner | A47L 9/0488 |
| 2004/0181896 A1* | 9/2004 | Egawa | G05D 1/0219 |
| | | | 15/319 |
| 2005/0273200 A1* | 12/2005 | Hietmann | B25J 9/1666 |
| | | | 700/248 |
| 2011/0194755 A1* | 8/2011 | Jeong | G06K 9/00664 |
| | | | 382/153 |
| 2011/0264305 A1* | 10/2011 | Choe | G05D 1/0274 |
| | | | 701/2 |
| 2012/0215351 A1* | 8/2012 | McGee | B25J 9/1666 |
| | | | 700/248 |
| 2014/0334713 A1* | 11/2014 | Kim | G05D 1/024 |
| | | | 382/153 |
| 2014/0343783 A1* | 11/2014 | Lee | G05D 1/0011 |
| | | | 701/25 |
| 2014/0350839 A1* | 11/2014 | Pack | G05D 1/0214 |
| | | | 701/409 |
| 2015/0336269 A1* | 11/2015 | Linnell | B25J 9/1656 |
| | | | 700/245 |
| 2017/0028559 A1* | 2/2017 | Davidi | B25J 9/1682 |
| 2017/0273527 A1* | 9/2017 | Han | A47L 9/009 |
| 2018/0074508 A1* | 3/2018 | Kleiner | A47L 9/2852 |
| 2018/0267540 A1* | 9/2018 | Sonoura | G05D 1/0221 |
| 2019/0094870 A1* | 3/2019 | Afrouzi | G05D 1/0219 |
| 2019/0176321 A1* | 6/2019 | Afrouzi | G05D 1/0044 |
| 2020/0125115 A1* | 4/2020 | Hsu | G05D 1/0287 |

* cited by examiner

METHODS AND SYSTEMS OF DISTRIBUTING TASK REGIONS FOR A PLURALITY OF CLEANING DEVICES

CROSS REFERENCE TO RELATED APPLICATIONS

The present application is based on, and claims priority from, Taiwan Application Serial Number 107137349, filed Oct. 23, 2018, the disclosure of which is hereby incorporated by reference herein in its entirety.

BACKGROUND

Field of the Invention

The present disclosure relates to a method of distributing task regions for cleaning devices, a task distribution system for cleaning devices, and the cleaning devices.

Description of the Related Art

With the advancement of technology, the application of cleaning devices such as sweeping robots in daily life has been quite extensive. However, the region that needs to be swept in the average home environment is often not composed of a single rectangle, and the existing method of task region distribution is to finish the sweep of a fixed-sized task region before moving on to the next task region. In this way, the cleaning devices will perform too many unnecessary turning actions, resulting in increasing the cleaning time and reducing efficiency. Therefore, how to efficiently divide the cleaning region to increase the cleaning efficiency is a problem that needs to be solved at present.

BRIEF SUMMARY

An embodiment of the present disclosure provides a method of distributing task regions for a plurality of cleaning devices, comprising: acquiring a task map; acquiring a shape corresponding to the task map; dividing the task map into a plurality of basic sub-regions according to a plurality of concave corners of the shape; combining each two adjacent basic sub-regions, and calculating a basic cleaning time corresponding to each of the combined basic sub-regions, wherein each two adjacent basic sub-regions have a common side of equal length; combining each two adjacent basic sub-regions repeatedly according to the length of the basic cleaning time until all of the adjacent basic sub-regions do not have a common side of equal length, and obtaining a basic partition result; selecting a plurality of starting blocks according to positions of a plurality of task sub-regions in the basic partition result, wherein the number of starting blocks is equal to the number of cleaning devices; combining the plurality of task sub-regions according to the position of each of the starting blocks, the position of each of the task sub-regions, and the cleaning time corresponding to each of the task sub-regions until the number of remaining task sub-regions is equal to the number of cleaning devices, and obtaining a task region distribution result; and enabling each of the cleaning devices to perform a cleaning task according to the positions of the cleaning devices and the task region distribution result.

Another embodiment of the present disclosure provides a task distribution system for cleaning devices, comprising a plurality of cleaning devices and a control terminal. The control terminal includes a first storage unit and a first processing unit. The first storage unit is used for storing task map. The first processing unit is used for: acquiring the task map from the first storage unit; acquiring a shape corresponding to the task map; dividing the task map into a plurality of basic sub-regions according to a plurality of concave corners of the shape; combining each two adjacent basic sub-regions and calculating a basic cleaning time corresponding to each combination, wherein each two adjacent basic sub-regions have a common side of equal length; combining each two adjacent basic sub-regions repeatedly according to the length of the basic cleaning time until all of the adjacent basic sub-regions don't have a common side of equal length, and obtaining a basic partition result; selecting a plurality of starting blocks according to positions of a plurality of task sub-regions in the basic partition result, wherein the number of starting blocks is equal to the number of cleaning devices; combining the plurality of task sub-regions according to the position of each of the starting blocks, the position of each of the task sub-regions, and the cleaning time corresponding to each of the task sub-regions until the number of remaining task sub-regions is equal to the number of cleaning devices, and obtaining a task region distribution result; and distributing a cleaning task to each of the cleaning devices according to the position of the cleaning devices and the task region distribution result. Each of the cleaning devices includes a second storage unit and a second processing unit. The second storage unit is used for storing the task regions distribution result. The second processing unit is used for performing the cleaning task according to the task region distribution result.

DETAILED DESCRIPTION

The method of distributing task regions for cleaning devices of the present disclosure and other ranges to which the system is applicable will be apparent from the detailed description provided hereinafter. It should be understood that the following detailed description and specific embodiments, when the exemplary embodiments related to the method of distributing task regions for a plurality of cleaning devices and the system thereof are set forth, are presented solely for illustrative purposes and not intended to limit the scope of the present disclosure.

Figure 1:
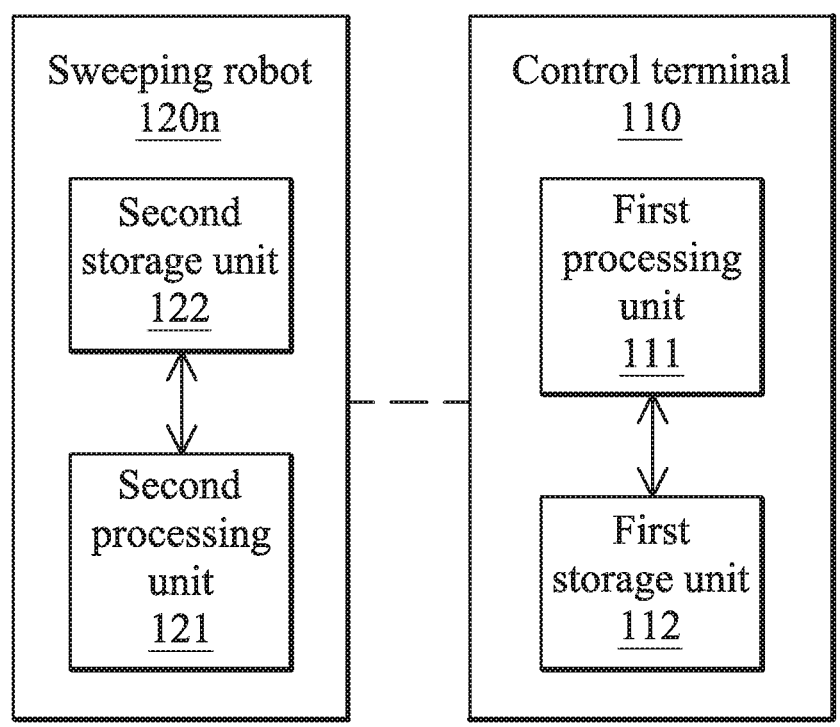
FIG. 1 illustrates a system architecture diagram of the task distribution system for cleaning devices according to an embodiment of the present disclosure.

FIG. 1 illustrates a system architecture diagram of the task region distribution system for cleaning devices according to an embodiment of the present disclosure. The task distribution system may include a control terminal 110 and a plurality of cleaning devices 120n, where n is a positive integer greater than 0. The control terminal 110 may be implemented on electronic devices such as desktops, laptops, tablet, or smart phones. The control terminal 110 includes at least a first processing unit 111, a first storage unit 112, and a first communication interface (not shown in FIG. 1). The first processing unit 111 may be implemented through various ways such as dedicated hardware circuit or general hardware (e.g. a single processor, multiple processors with parallel processing function, a graphics processor, or other processors with operation capability). The first processing unit 111 provides the functions described afterwards when executing the codes or the software. The first storage unit 112 is configured to store at least one task map, task-related information generated according to the task map, and the like for the first processing unit 111 to access when performing related operations. The first storage unit 112 may be a non-volatile storage device such as hard disk, flash memory, ROM, and so on. In addition, the control terminal 110 may further includes a wireless communication interface (not shown) which can be a local area network (LAN) communication module, a wireless local area network (WLAN) communication module, or a Bluetooth communication module, etc., for exchanging various signals and data with the cleaning device 120. In a specific embodiment, the cleaning device is, for example, a cleaning robot.

Each of the cleaning devices 120n includes at least a second processing unit 121 and a second storage unit 122. Similarly, the second processing unit 121 may be implemented through various ways, for example, dedicated hardware circuit or general hardware, and provide the functions described afterwards when executing the codes or the software. The second storage unit 122 may be a non-volatile storage device such as hard disk, flash memory, ROM, and so on. The second storage unit 122 is used for storing the task map and storing the cleaning task-related information received by the second processing unit 121. The second processing unit 121 is configured to perform the cleaning task according to the received task map or perform the calculation related to the cleaning task.

Figure 2A:
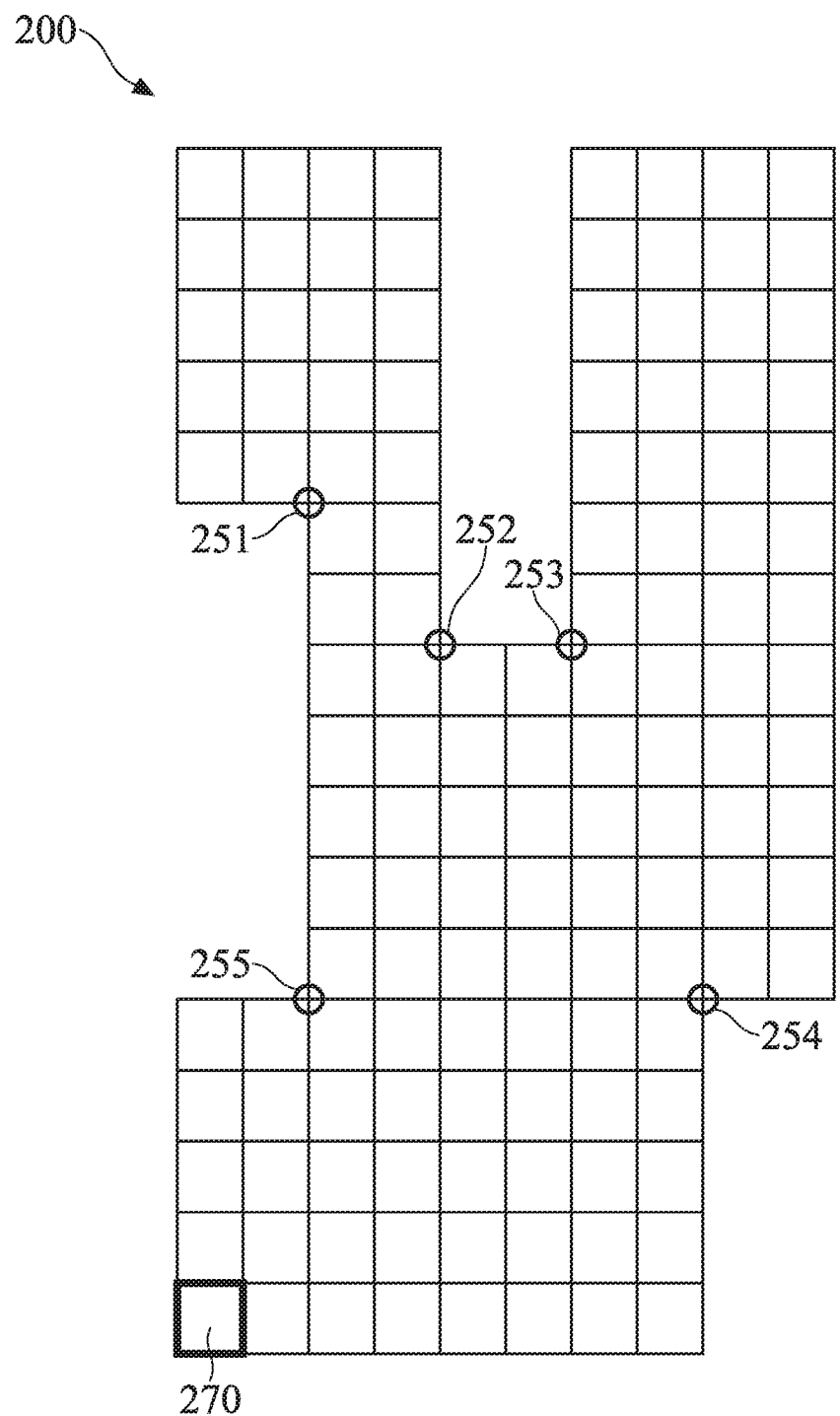
FIG. 2A-2D show the schematic diagrams of the task map and dividing the task map into a plurality of task sub-regions, in accordance with some embodiments of the present disclosure.

FIGS. 2A-2D show the schematic diagrams of the task map and dividing the task map into a plurality of task sub-regions, in accordance with some embodiments of the present disclosure. In accordance with an embodiment of the present disclosure, after the first processing unit 111 of the control terminal 110 receives the task map 200 as shown in FIG. 2A, the first processing unit 111 acquires the shape of the task map 200 first, and then acquires all of each concave corner (such as the concave corner 251-255 shown in FIG. 2A) in the task map 200 according to the shape, to perform the following task sub-region dividing operation. The square 270 shown in FIG. 2A illustrates the smallest cleaning unit (area or region) that can be cleaned by the cleaning device 120. The square 270 is used for evaluating the time required to clean each of the task sub-regions. After that, the first processing unit 111 divides the task map 200 into a plurality of basic sub-regions along the edges of the concave corners. For example, when the task map 200 shown in FIG. 2A is cut longitudinally and laterally by using the concave corners 251-255 as the datum point, a plurality of basic sub-regions 201-213 shown in FIG. 2B can be obtained.

Figure 2B:
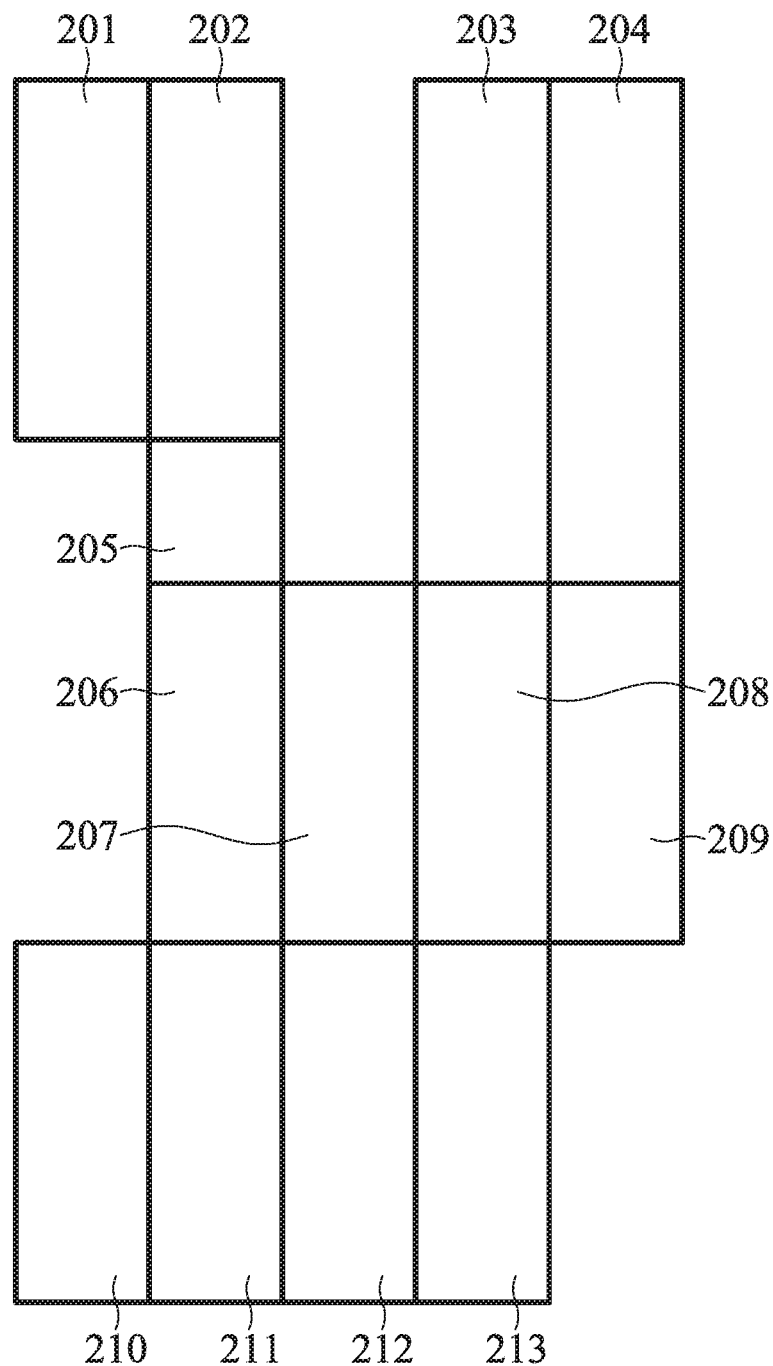
Figure 2C:
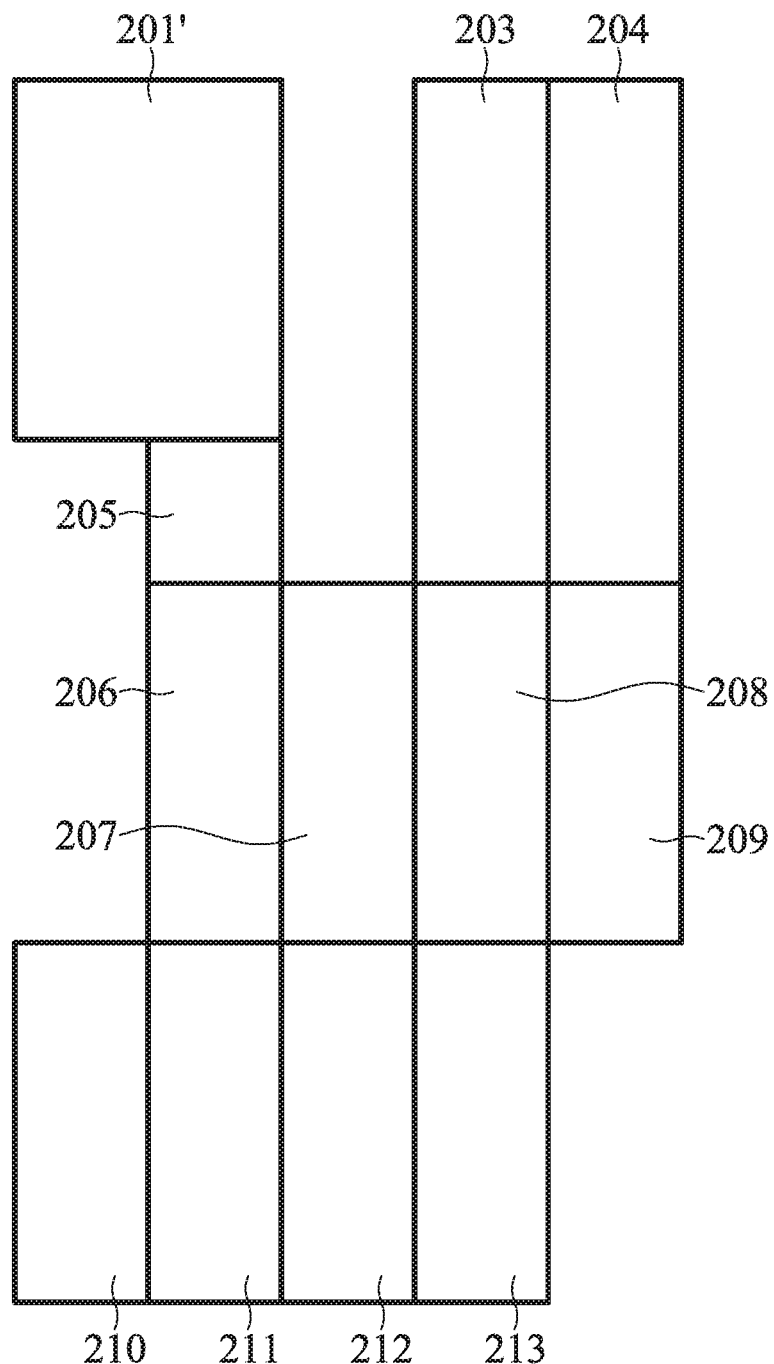
Figure 2D:
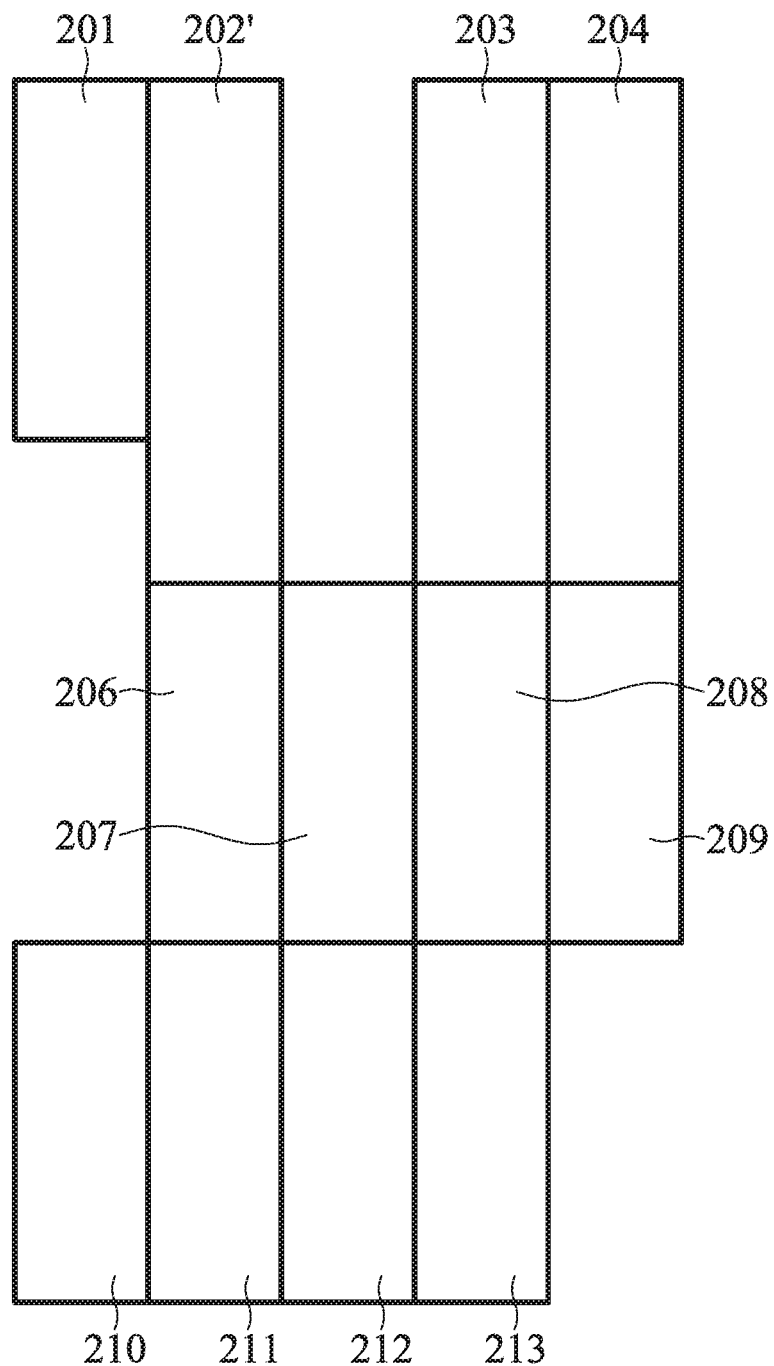

After obtaining the basic sub-regions 201-213, the first processing unit 111 combines (or merges) adjacent and neighbor basic sub-regions, and calculates the cleaning time corresponding to the combined sub-regions. Two basic sub-regions being combined have a common side of equal length. For example, as shown in FIG. 2B, since the basic sub-region 201 is neighbor and adjacent to the basic sub-region 202, and the length of right side of the basic sub-region 201 is equal to the length of left side of the basic sub-region 202, the first processing unit 111 combines the basic sub-region 201 with the basic sub-region 202 to be an another larger sub-region, called a combined basic sub-region 201' (the first combining result), as shown in FIG. 2C, and calculates the time required for cleaning the combined basic sub-region 201'. Similarly, as shown in FIG. 2B, since the basic sub-region 202 is neighbor and adjacent to the basic sub-region 205, and the length of the underside of the basic sub-region 202 is equal to the length of the upside of the basic sub-region 205, the first processing unit 111 combines the basic sub-region 202 with the basic sub-region 205 to be an another larger sub-region, called a combined basic sub-region 202' (the second combining result), as shown in FIG. 2D, and calculates the time required for cleaning the combined basic sub-region 202', and so on. After the first processing unit 111 combines each two basic sub-regions and calculates the time required for cleaning the combined basic sub-regions, the first processing unit 111, from the above calculated combining results, remains the first three combined basic sub-regions that have the shortest cleaning time as "the first-time combining result." Then the first processing unit 111 performs the second-time combining operation. The second combining operation is as described above, the first processing unit 111 combines two basic sub-regions or two combined basic sub-regions having a common side of equal length, and calculates the corresponding cleaning time, then from the above calculated combining results, remains the first three combined basic sub-regions that have the shortest cleaning time as the "second-time combining result." And so on, the first processing unit 111 repeatedly performs the combining operation as described above until all the combined basic sub-regions do not have a common side of equal length. These combined basic sub-regions are called task sub-regions. The first processing unit 111 further stores the last combining result as a "basic partition result."

Figure 3A:
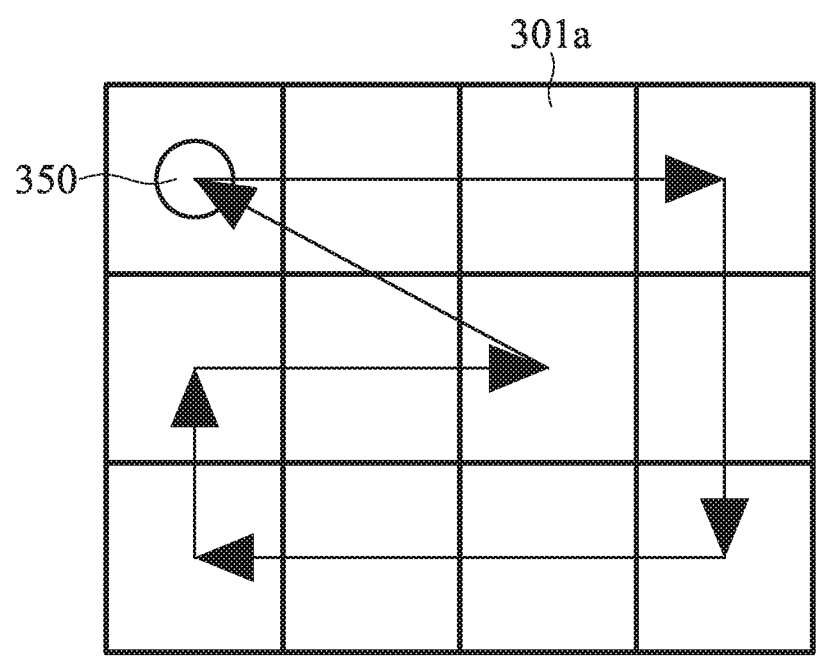
FIGS. 3A and 3B show the schematic diagrams of the cleaning route of the cleaning devices, in accordance with some embodiments of the present disclosure.
Figure 3B:
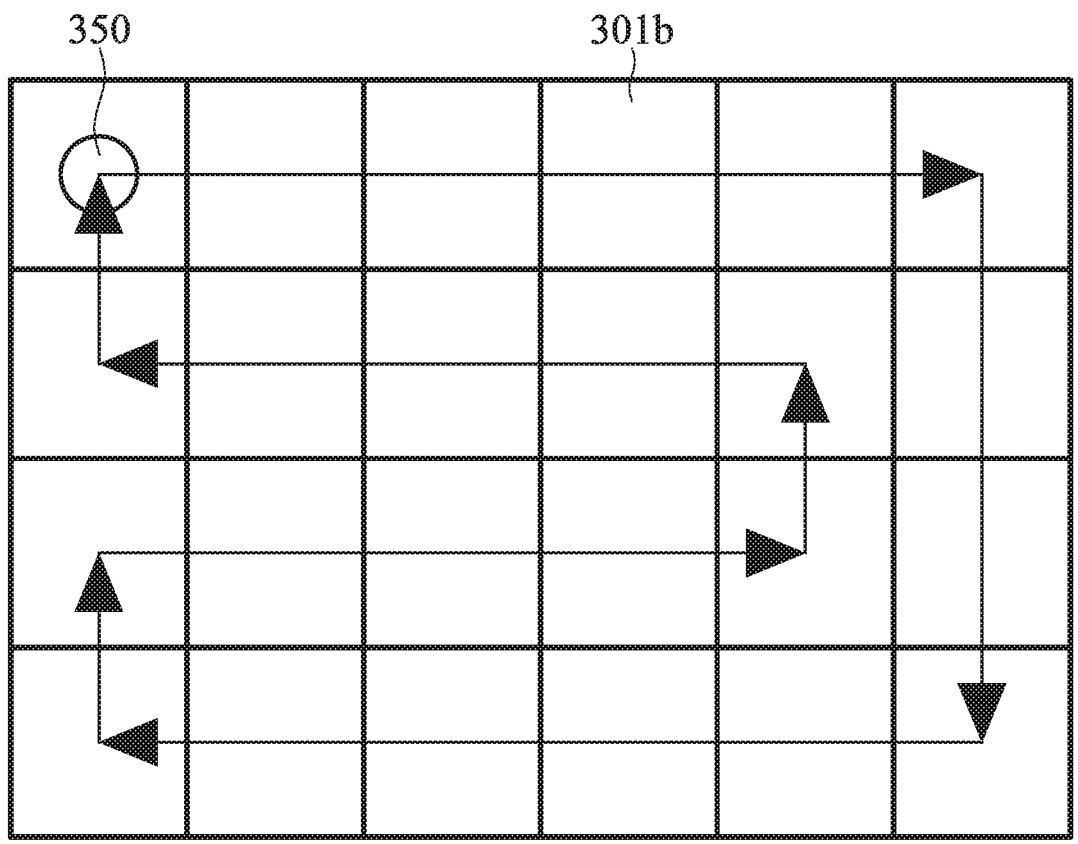

When calculating the cleaning time corresponding to each of the sub-region (e.g., basic sub-region, combined basic sub-region, task sub-region, combined task sub-region, etc), the first processing unit 111 further applies different formulas according to the length of the short side of the sub-regions. For example, FIGS. 3A and 3B show the schematic diagrams of the cleaning route of the cleaning devices, in accordance with some embodiments of the present disclosure. Since the time required for the cleaning device to clean the smallest cleaning unit (area or region) is less than the time required for turning, the optimization cleaning route is the route with the least number of turns when the cleaning device is cleaning a task sub-region. In some embodiments of the present disclosure, the way of cleaning the task sub-regions is cleaning along the long side to minimize the number of turns. For example, as shown in FIG. 3A, the size of the task sub-region 301a is 4*3 and the starting position of the cleaning device is starting position 350. First, the cleaning device cleans along the long side of the upside of the task sub-region 301a until it moves to the uppermost right corner of the task sub-region 301a. Next, the cleaning device turns 90 degrees and cleans along the straight line (i.e., the two smallest cleaning units) until it moves to the lowermost right corner of the task sub-region 301a, and so on. Finally, after the cleaning device returns to the starting position 350 along the route shown in FIG. 3A, the cleaning of task sub-region 301a is completed. According to the route above, in response to the number of cleaning units on the short side of the task sub-region being odd, the first processing unit 111 calculates the time required for cleaning a task sub-region according to the following formula:

$$T_{total}=2XT+XYL+RL$$

$$R=\sqrt{1+(Y-2)^2}-1$$

where $T_{total}$ is the time required for cleaning, X is the number of cleaning units on the short side, Y is the number of cleaning units on the long side, T is the time required for the cleaning device to turn, and L is the time required for the cleaning device to clean one of the cleaning units. In addition, when the long side of the task sub-region is longer, R is approximately equal to Y−2.

FIG. 3B shows the schematic diagrams of the cleaning route of the cleaning device, in accordance with another embodiment of the present disclosure. Compared to the task sub-region 301a, the number of leaning units on the short side of the task sub-region 301b is even, so that when the cleaning device wants to return to the starting position 350, it can move parallel to the long side. For example, as shown in FIG. 3B, in order to complete the cleaning of the task sub-region 301b, the cleaning device will clean 6*4 smallest cleaning units, and performs eight turns. Similarly, according to the route above, in response to the number of cleaning units on the short side of the task sub-region being even, the first processing unit 111 calculates the time required to clean a task sub-region according to the following formula:

$$T_{total}=2XT+XYL$$

Similarly, $T_{total}$ is the time required for cleaning, X is the number of cleaning units on the short side, Y is the number of cleaning units on the long side, T is the time required for the cleaning device to turn, and L is the time required for the cleaning device to clean one of the cleaning units.

As shown in Table 1, Table 1 illustrates the time required for cleaning the task sub-regions with different sizes, in accordance with some embodiments of the present disclosure. The time required for cleaning shown in the table was obtained using the above two formulas.

TABLE 1

| Size of the task sub-region | Time required for completing the cleaning task and returning to the starting position |
|---|---|
| 2 * 2 | 4T + 4L |
| 2 * 3 | 4T + 6L |
| 3 * 3 | 6T + 8L + $\sqrt{1+(3-2)^2}$ * L |
| 3 * 4 | 6T + 11L + $\sqrt{1+(4-2)^2}$ * L |
| 4 * 4 | 8T + 16L |
| 4 * 5 | 8T + 20L |

TABLE 1-continued

| Size of the task sub-region | Time required for completing the cleaning task and returning to the starting position |
|---|---|
| 4 * 6 | 8T + 24L |
| 5 * 5 | 10T + 24L + $\sqrt{1+(5-2)^2}$ * L |

It is worth noting that the related operations of dividing the task map and combining the task sub-region described above may also be performed by the second processing unit 121 of the cleaning device 120. In other words, the cleaning device 120 can directly download the task map from control terminal 110, and perform the related operations.

After the first processing unit 111 obtains the basic partition result and the cleaning time corresponding to each of the task sub-regions, the first processing unit 111 further substantially equally distributes the task sub-regions to the plurality of cleaning devices according to the cleaning time of each of the task sub-regions to increase the efficiency of performing the cleaning task. Distributing the task sub-regions substantially equally indicates that the difference between the time required for each cleaning device to complete the task sub-region distributed to itself and the average cleaning time is less than a given tolerance. In addition, the average cleaning time is equal to the sum of the cleaning time corresponding to each of the task sub-regions in the basic partition result divided by the number of cleaning devices.

TABLE 2

| | Serial number of the task | |
|---|---|---|
| sub-region | Size of the task sub-region | Cleaning time (seconds) |
| 401 | 4 * 18 | 15.2 s |
| 402 | 5 * 19 | 21.3 s |
| 403 | 6 * 9 | 17.4 s |
| 404 | 10 * 16 | 36 s |
| 405 | 5 * 7 | 14.1 s |

Figure 4:
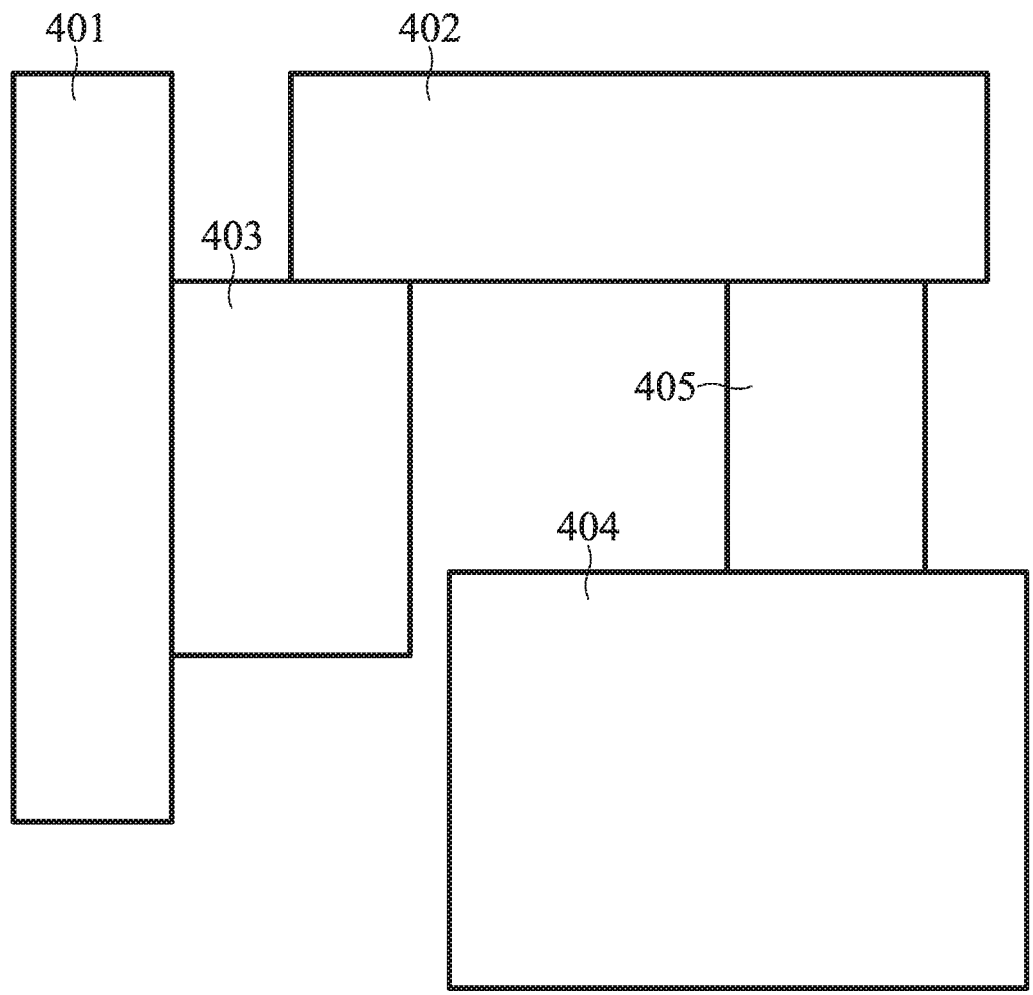
FIG. 4 is a schematic diagram that shows the basic partition result corresponding to a task map, in accordance with an embodiment of the present disclosure.

FIG. 4 is a schematic diagram that shows the basic partition result corresponding to a task map, in accordance with an embodiment of the present disclosure. Table 2 shows the sizes and cleaning time corresponding to each of the task sub-regions in FIG. 4.

Figure 5:
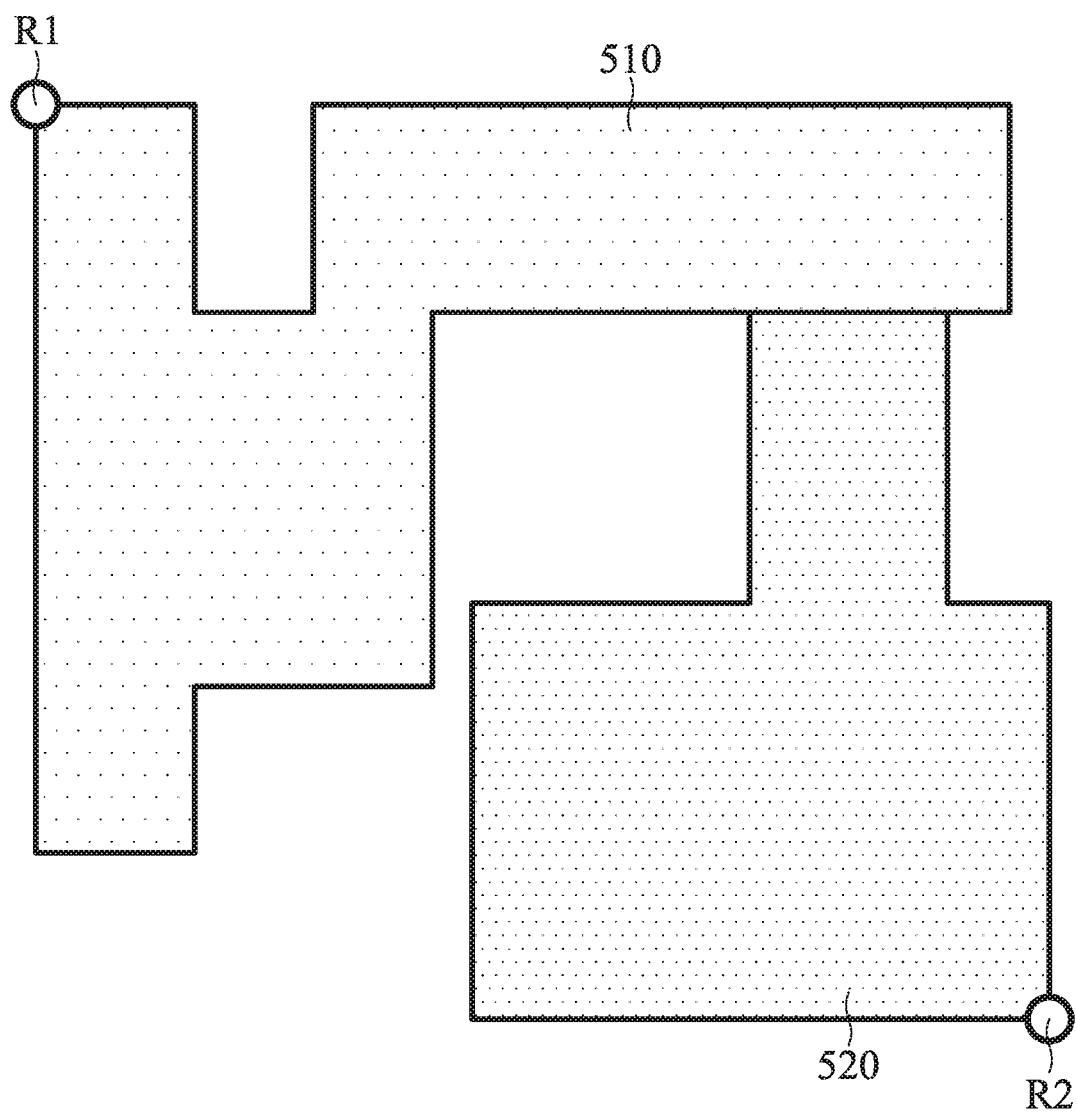
FIG. 5 is a schematic diagram that shows the optimization partition corresponding to two cleaning devices, in accordance with an embodiment of the present disclosure.

FIG. 5 is a schematic diagram that shows the optimization partition corresponding to two cleaning devices, in accordance with an embodiment of the present disclosure. According to the Table 2, the sum of the cleaning time of all the task sub-regions (401~405 in FIG. 4) that can be obtained by the first processing unit 111 is 15.2+21.3+17.4+36+14.1=104 (seconds). And the average cleaning time is 104/2=52 (seconds). Next, the first processing unit 111 combines the task sub-regions shown in FIG. 4 according to the average cleaning time until the cleaning time corresponding to two combined task sub-regions approaches to 52 seconds. First, according to FIG. 4, both the task sub-region 401 and the task sub-region 404 are farthest from the center of the entire task map, therefore, the first processing unit 111 first selects the task sub-region 401 and the task sub-region 404 as starting blocks (R1 and R2 shown in FIG. 5 are the starting position for cleaning devices to clean) of two cleaning devices. Next, since the cleaning time (15.2 seconds) corresponding to the task sub-region 401 is less than the cleaning time (36 seconds) corresponding to the task sub-region 404, and the task sub-region 403 is adjacent to task sub-region 401, the first processing unit 111 combines the task sub-region 401 with the task sub-region 403, and obtains the corresponding cleaning time (i.e. 15.2+17.4=32.6 seconds). However, since the cleaning time corresponding to the combined task sub-region is still less than the cleaning time (36 seconds) corresponding to the task sub-region 404, the first processing unit 111 then combines the combined task sub-region with the task sub-region 402, and obtains the corresponding cleaning time (i.e. 32.6+21.3=53.9 seconds). The cleaning time corresponding to the combined task sub-region has been longer than the cleaning time (36 seconds) corresponding to the task sub-region 404, and the difference between the cleaning time corresponding to the combined task sub-region and the average cleaning time (52 seconds) is less than the given tolerance (e.g. 10% of the average cleaning time). Then, the first processing unit 111 completes a task region distribution (the task region 510 as shown in FIG. 5) of the cleaning device.

Next, since the difference between the cleaning time corresponding to the task sub-region 404 and the average cleaning time is still longer than the given tolerance, and the task sub-region 404 is adjacent to the task sub-region 405, the first processing unit 111 combines the task sub-region 404 with the task sub-region 405, and obtains the corresponding cleaning time of 50.1 seconds. The difference between the cleaning time corresponding to the combined task sub-region and the average cleaning time (52 seconds) has been less than the given tolerance, and there are no task sub-regions in the task map that have not been combined. Then, the first processing unit 111 configures the combined task sub-region as the task region (the task region 520 as shown in FIG. 5) relative to another cleaning device. Next, the first processing unit 111 further distributes the two task regions to two cleaning devices through the first communication interface according to the positions of the two cleaning devices, so that two cleaning devices can perform the cleaning operation according to the task region.

Figure 6A:
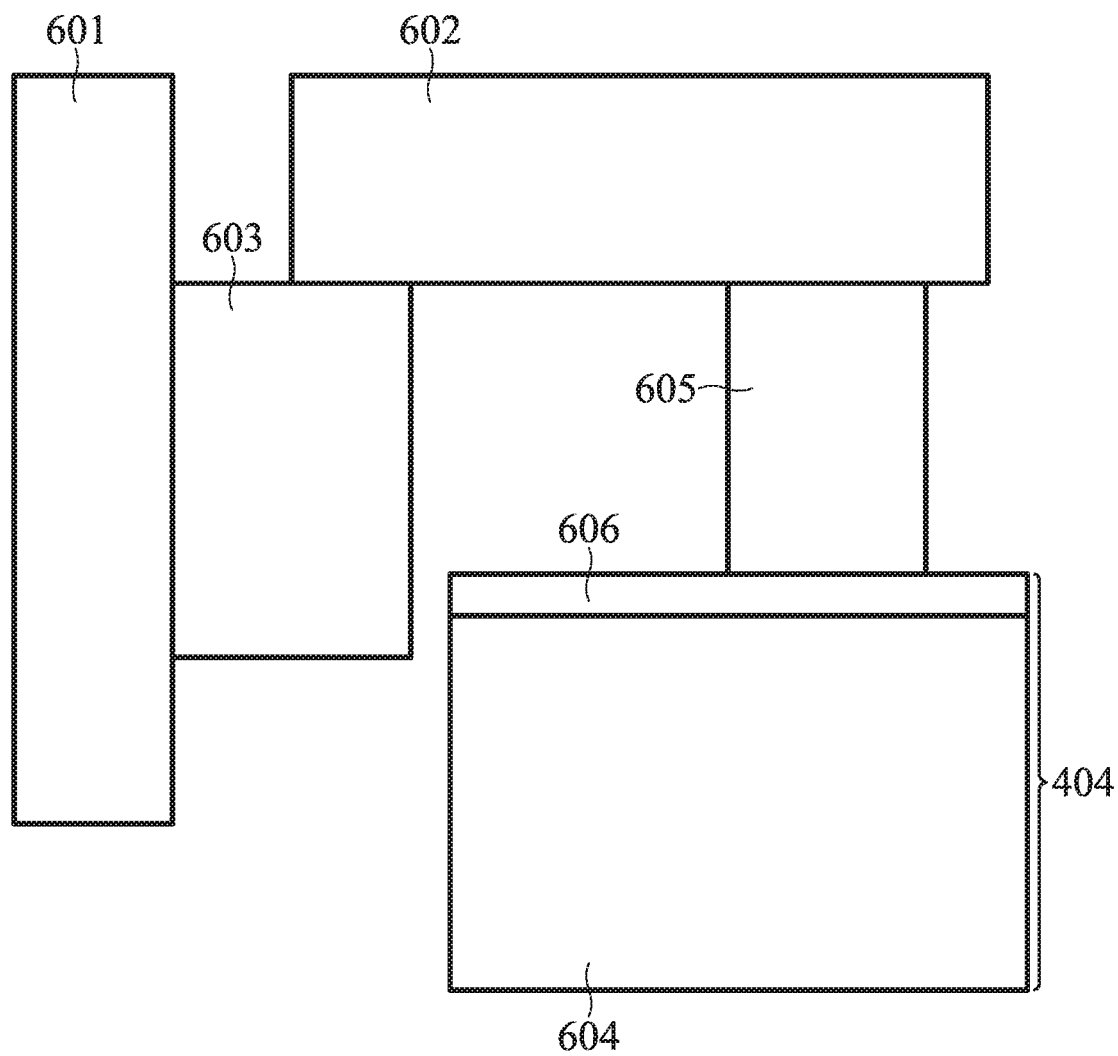
FIGS. 6A and 6B are schematic diagrams that show the optimization partition corresponding to three cleaning devices, in accordance with an embodiment of the present disclosure.
Figure 6B:
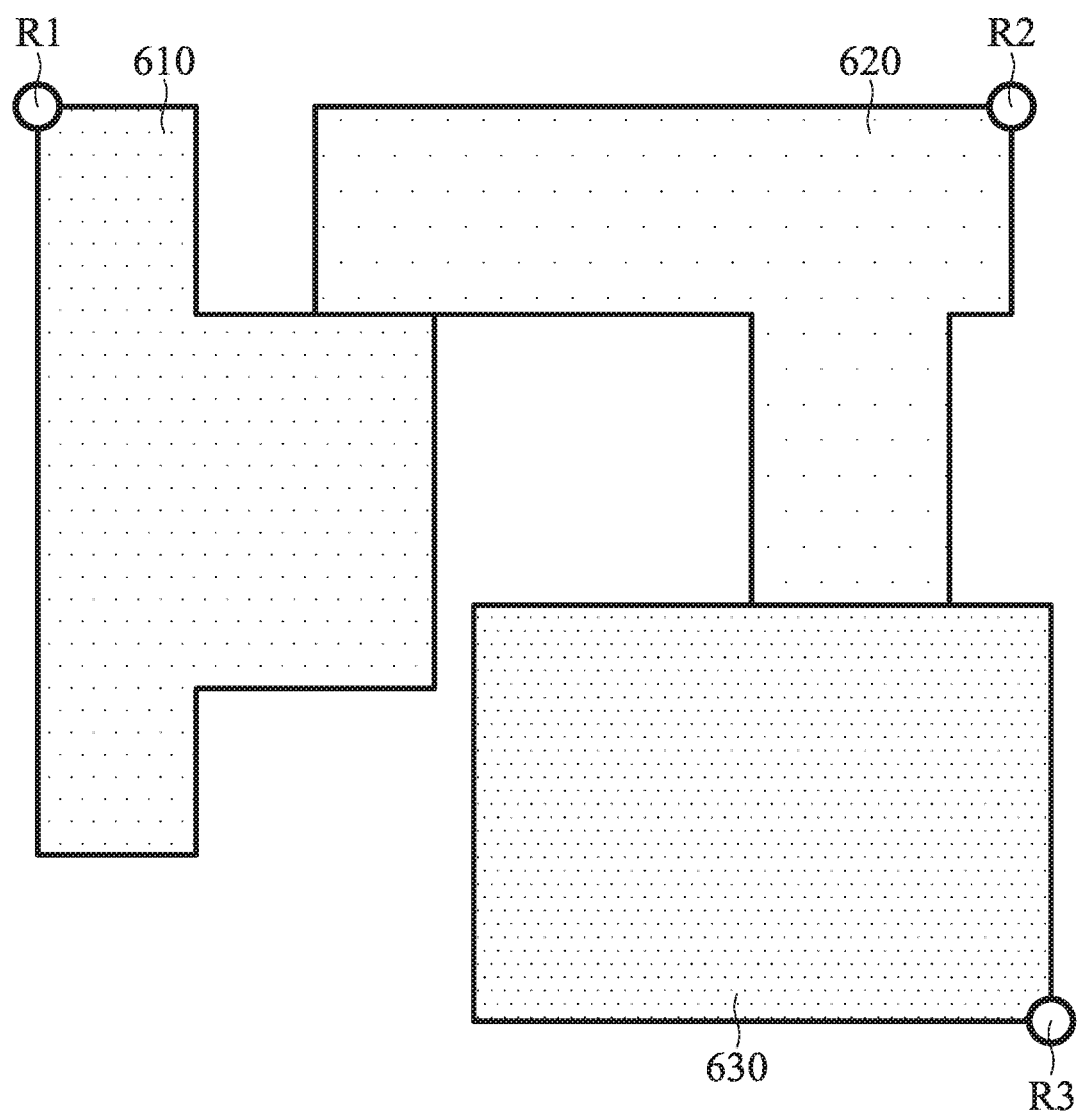

FIGS. 6A and 6B are schematic diagrams that show the optimization partition corresponding to three cleaning devices, in accordance with another embodiment of the present disclosure. The task maps of FIGS. 6A and 6B are the same as the task map of FIG. 4, therefore, the task sub-regions 601, 602, 603, and 605 are equal to the task sub-regions 401, 402, 403, and 405, respectively, and the task sub-region 604 plus task sub-region 606 equals task sub-region 404. In response to there being three cleaning devices, the average cleaning time is 104/3=34.67 (seconds). Since the cleaning time (36 seconds) corresponding to the biggest task sub-region 404 has been longer than the average cleaning time, the first processing unit 111 reduces the cleaning region of the task sub-region 404 first. When reducing the area of the task sub-region, the dividing will be performed along the long side of the task sub-region 404 to avoid increasing the number of turns of the cleaning device. For example, as shown in FIG. 6A, the task sub-region 404 (having 10*16 smallest cleaning units) is divided into the task sub-region 604 (9*16) and the task sub-region 606 (1*16). Then, the first processing unit 111 selects the starting blocks of three cleaning devices. The task sub-region 601, the task sub-region 602, and the task sub-region 604 are three task sub-regions which are farthest from the center of the entire task map. Therefore, the first processing unit 111 sets the task sub-region 601, the task sub-region 602, and the task sub-region 604 as the starting blocks of three cleaning devices. The first processing unit 111 then selects which has the shortest cleaning time from the three task sub-regions as the priority combining task sub-region (i.e. task sub-region 601), and determines that whether the priority combining task sub-region has the adjacent task sub-region. Since the task sub-region 603 is adjacent to the task sub-region 601, the first processing unit 111 combines the two as the first combining result, and calculates that the corresponding cleaning time is 32.6 seconds.

Next, since the cleaning time (21.3 seconds) corresponding to the task sub-region 602 is less than the cleaning time (33.9 seconds) corresponding to the task sub-region 604 and the cleaning time (32.6 seconds) corresponding to the first combining result, the first processing unit 111 determines whether the task sub-region 602 has the adjacent task sub-region which has not been combined. Since the task sub-region 605 is adjacent to the task sub-region 602, and the task sub-region 605 has not been combined, the first processing unit 111 combines the task sub-region 605 with the task sub-region 602 as the second combining result, and calculates that the corresponding cleaning time is 35.4 seconds.

Next, the cleaning time (32.6 seconds) corresponding to the first combining result (combining the task sub-regions 601/401 and 603/403) is less than the cleaning time (33.9 seconds) corresponding to the task sub-region 604 and cleaning time (35.4 seconds) corresponding to the second combining result (combining the task sub-regions 602/402 and 605/405), but the first combining result has not had the adjacent task sub-regions which have not been combined. Therefore, the first processing unit 111 further determines whether the task sub-region 604 has the adjacent task sub-region which has not been combined. Since the task sub-region 606 has not been combined, the first processing unit 111 combines the task sub-region 604 with the task sub-region 606 as the third combining result, and calculates that the corresponding cleaning time is 36 seconds.

Finally, since there are no task sub-regions which have not been combined in the task map, the first processing unit 111 determines whether the differences between the average cleaning time and each of the cleaning time corresponding to the first combining result, the second combining result, and the third combining result are less than the given tolerance. After calculating, since the differences between the average cleaning time and each of the cleaning time corresponding to the first combining result, the second combining result, and the third combining result are less than the given tolerance, the first processing unit 111 sets the first combining result, the second combining result, and the third combining result as the last task regions (i.e. the task regions 610-630 shown in FIG. 6B), and distributes the task region 610-630 according to the position of the three cleaning devices.

Figure 7A:
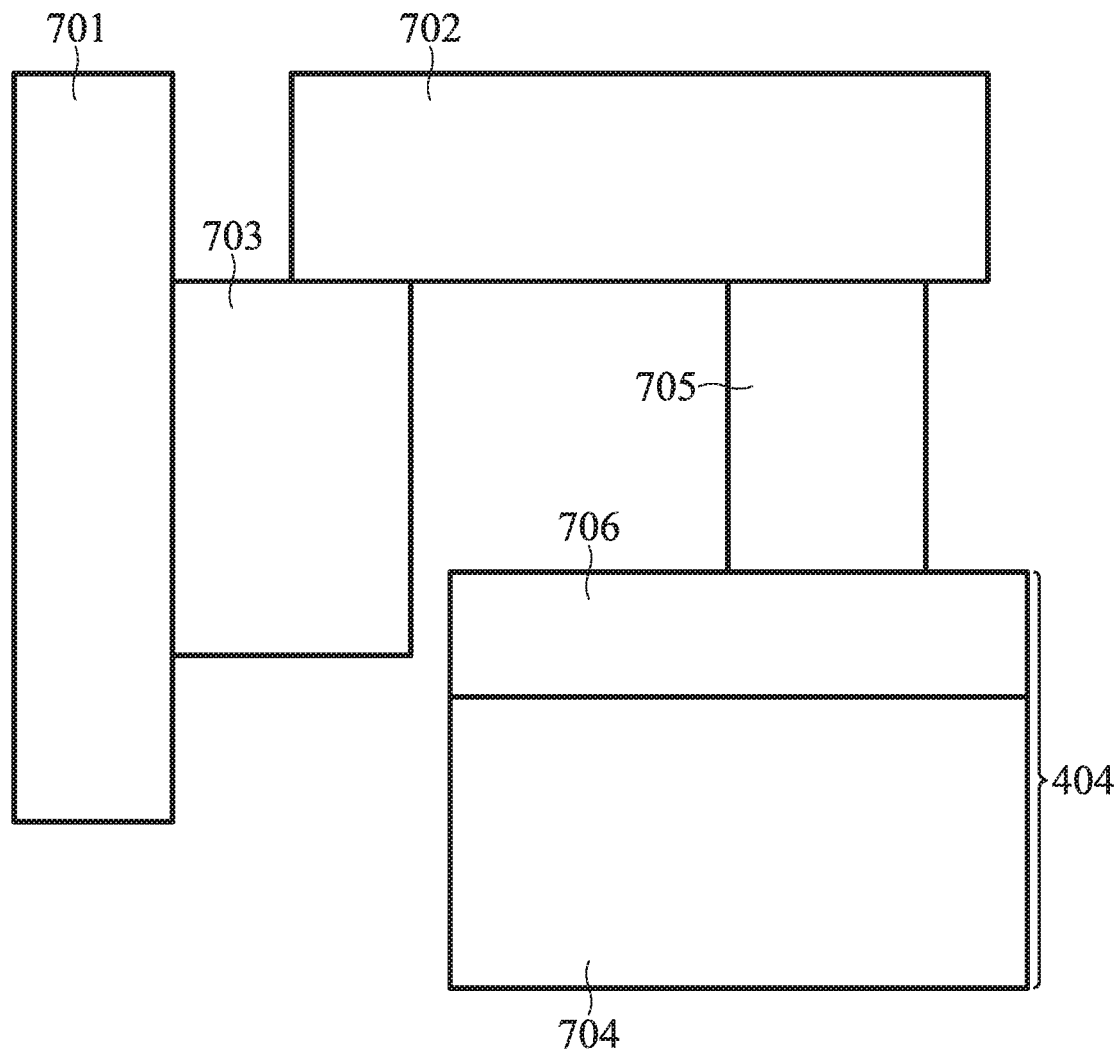
FIGS. 7A-7C are schematic diagrams that show the optimization partition corresponding to four cleaning devices, in accordance with an embodiment of the present disclosure.
Figure 7B:
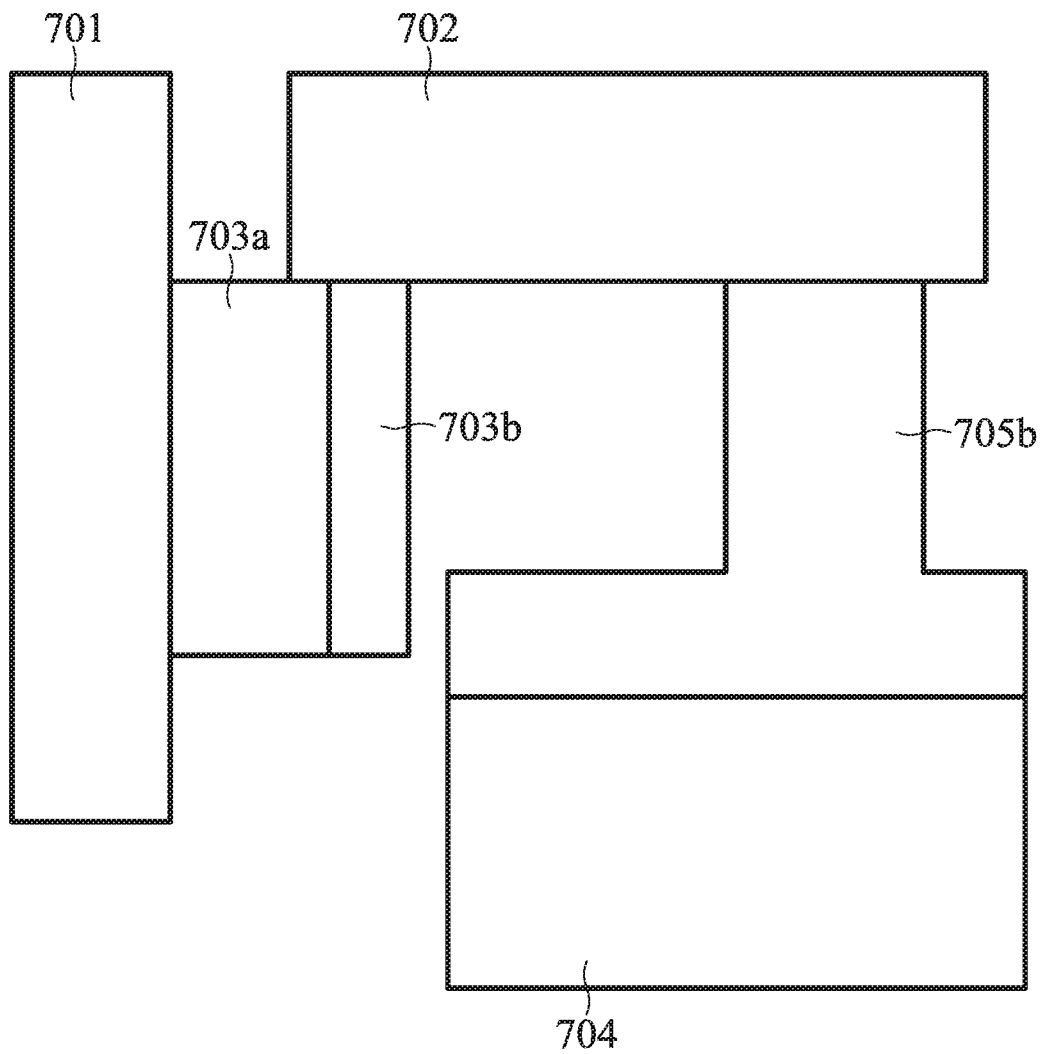
Figure 7C:
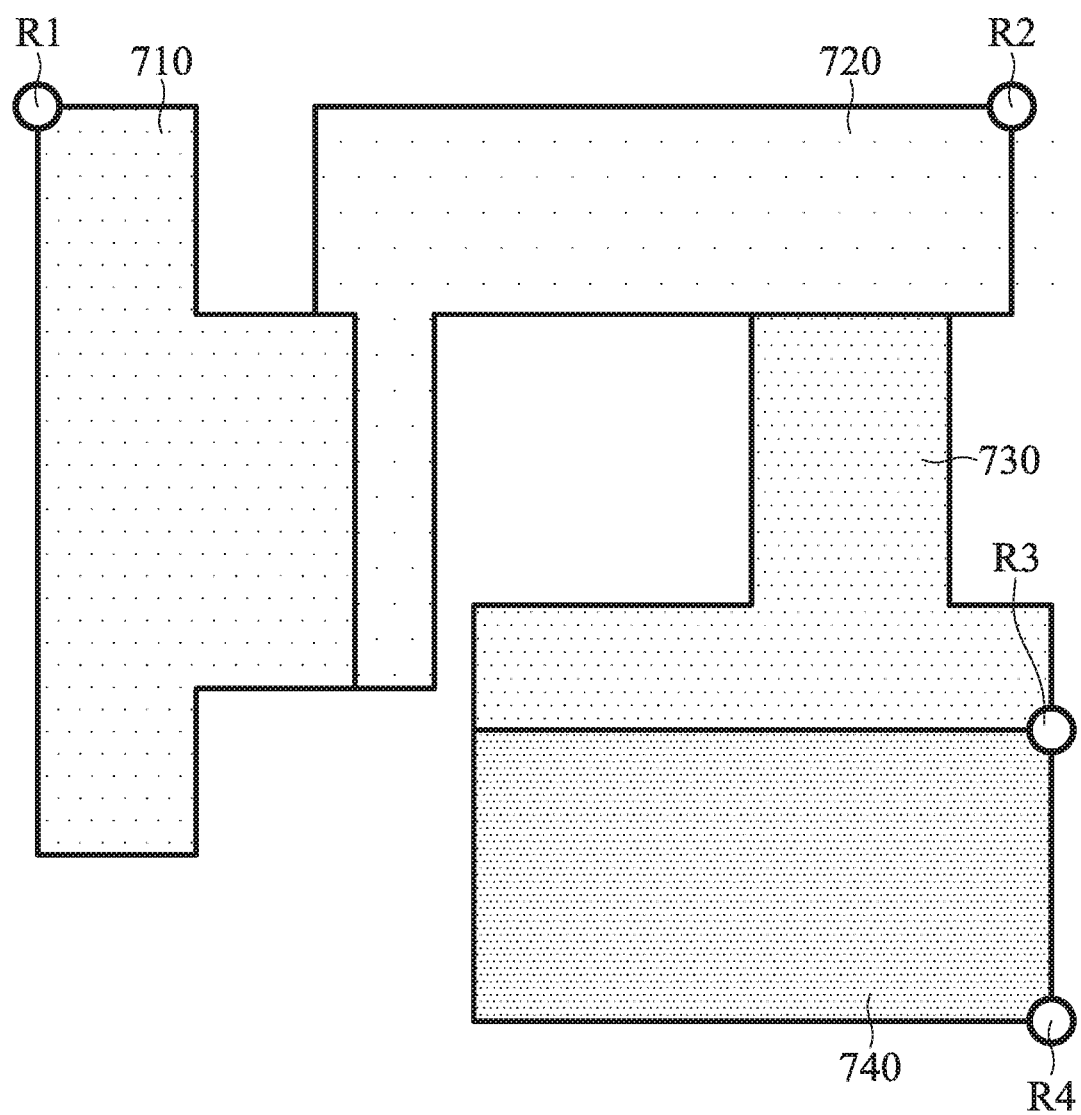

FIGS. 7A-7C are schematic diagrams that show the optimization partition corresponding to four cleaning devices, in accordance with another embodiment of the present disclosure. The task maps of FIGS. 7A-7C are the same as the task map of FIG. 4, therefore, the task sub-regions 701, 702, 703, and 705 are equal to the task sub-regions 401, 402, 403, and 405, respectively, and the task sub-region 704 plus task sub-region 706 equals task sub-region 404. In response to there being four cleaning devices, the average cleaning time is 104/4=26 (seconds). However, similarly, since the cleaning time corresponding to the biggest task sub-region 404 has been longer than the average cleaning time, the first processing unit 111 reduces the cleaning region of the task sub-region 404 first. When reducing the area of the task sub-region, the dividing is also performed along the long sides of the task sub-region 404 (as shown in FIG. 7A, the task sub-region 404 is divided into the task sub-region 704 (7*16) and the task sub-region 706

(3*16)) to avoid increasing the number of turns of the cleaning device. Next, since the task sub-region 701, the task sub-region 702, the task sub-region 706, and the task sub-region 704 are farthest from the center of the task map, the first processing unit 111 sets the task sub-region 701, the task sub-region 702, the task sub-region 706, and the task sub-region 704 as the starting blocks of the cleaning devices. Since the cleaning time corresponding to the task sub-region 706 is shortest, the first processing unit 111 first performs the combining for the task sub-region 706. Since the task sub-region 706 is adjacent to the task sub-region 705, the first processing unit 111 combines the task sub-region 706 with the task sub-region 705 as the first combining result, and calculates that the corresponding cleaning time is 26.4 seconds.

Next, since the cleaning time (15.2 seconds) corresponding to the task sub-region 701 is less than the cleaning time (26.4 seconds) corresponding to the first combining result, the cleaning time (26.7 seconds) corresponding to the task sub-region 704 and the cleaning time (21.3 seconds) corresponding to the task sub-region 702, the first processing unit 111 determines whether the task sub-region 701 has the adjacent task sub-region which has not been combined. Since the task sub-region 703 is adjacent to the task sub-region 701, and the task sub-region 703 has not been combined, the first processing unit 111 combines the task sub-region 703 with the task sub-region 701 as the second combining result, and calculates that the corresponding cleaning time is 32.6 seconds.

Since the difference between the cleaning time corresponding to the second combining result and the average cleaning time is much longer than the given tolerance, and the task sub-region 703 is adjacent to the task sub-region 701 and the task sub-region 702 at the same time, the first processing unit 111 will divide the task sub-region 703 to make the cleaning time corresponding to the second combining result approach the average cleaning time. As shown in FIG. 7B, the first processing unit 111 re-divides the task sub-region 703 into the task sub-region 703a, 703b. Then the first processing unit 111 combines the task sub-region 703a with the task sub-region 701 to be the third combining result and combines the task sub-region 703b with the task sub-region 702 to be the forth combining result. The cleaning time corresponding to the third combining result is 26.8 seconds and the cleaning time corresponding to the forth combining result is 27.1 seconds, and the difference between the two and the average cleaning time are less than the given tolerance. Therefore, the first processing unit 111 sets the two as the task regions corresponding to the two cleaning devices.

Finally, since the difference between the cleaning time (26.7 seconds) corresponding to the task sub-region 704 and the average cleaning time is originally less than the given tolerance, and there are no task sub-regions which have not been combined with the starting block in the task map, the first processing unit sets the first combining result, the third combining result, the forth combining result, and the task sub-region 704 as the last task regions (i.e. the task regions 710-740 shown in FIG. 7C), and distributes the task region 710-740 according to the position of the four cleaning devices.

It is worth noting that when dividing the task sub-regions, the task sub-regions which have been divided will not be divided the second time. However, when all of the combined task sub-regions have been divided (i.e. the number of dividing is equal to the number of cleaning devices), the first processing unit 111 will increase the given tolerance proportionally (e.g. increasing the given tolerance by 5% each time).

Figure 8:
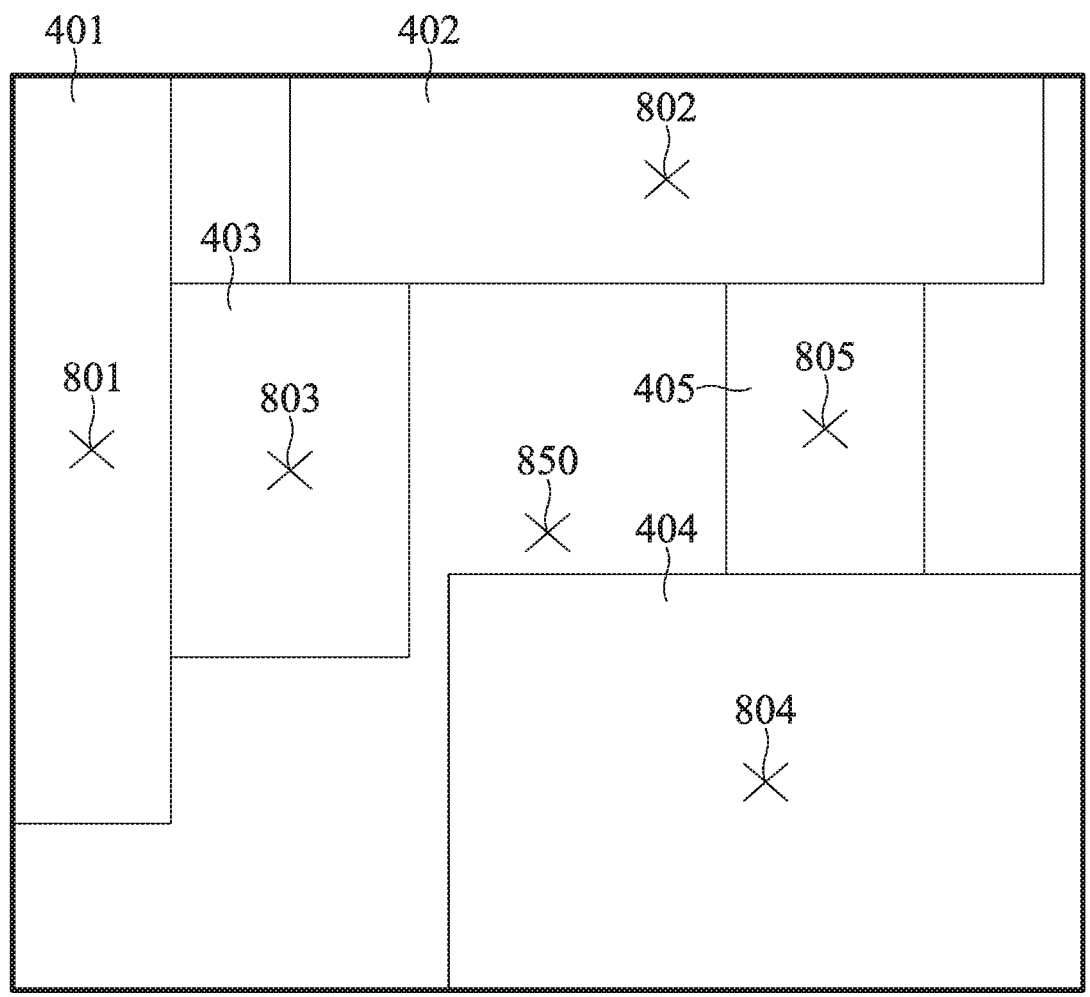
FIG. 8 is a schematic diagram that shows the center of the task map and the center of each task sub-region, in accordance with an embodiment of the present disclosure.

In addition, according to one embodiment of the present disclosure, when the distance between the task sub-region and the center of the task map is calculated, it means that the distance between the center of the task sub-region and the center of the task map is calculated. For example, as shown in FIG. 8, the center 850 of the task map is the center of the rectangle which can contain all of the task sub-regions, and the center 801-805 are the center of the task sub-region 401-405, respectively. Therefore, in the embodiment of the present disclosure, the center 801 of the task sub-region 401 is farthest from the center 850 of the task map so the task sub-region 401 is the first choice for the starting block of the cleaning devices.

Figure 9:
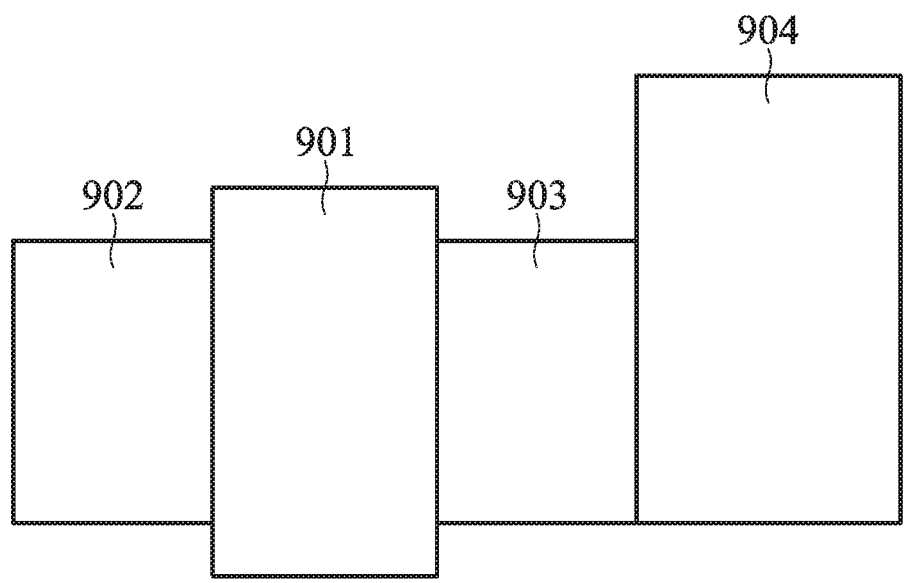
FIG. 9 is a schematic diagram of combining the adjacent task sub-regions, in accordance with an embodiment of the present disclosure.

According to another embodiment of the present disclosure, when combining the task sub-regions, if the original block has more than two adjacent task sub-regions, the first processing unit 111 will combine the task sub-region which is farther away from other task sub-regions. For example, as shown in FIG. 9, the task sub-region 901 is adjacent to the task sub-region 902 and the task sub-region 903 at the same time. Since the task sub-region 902 is farther away from other task sub-regions (e.g. task sub-region 904), the first processing unit 111 will preferentially combine the task sub-region 901 with the task sub-region 902.

Figure 10A:
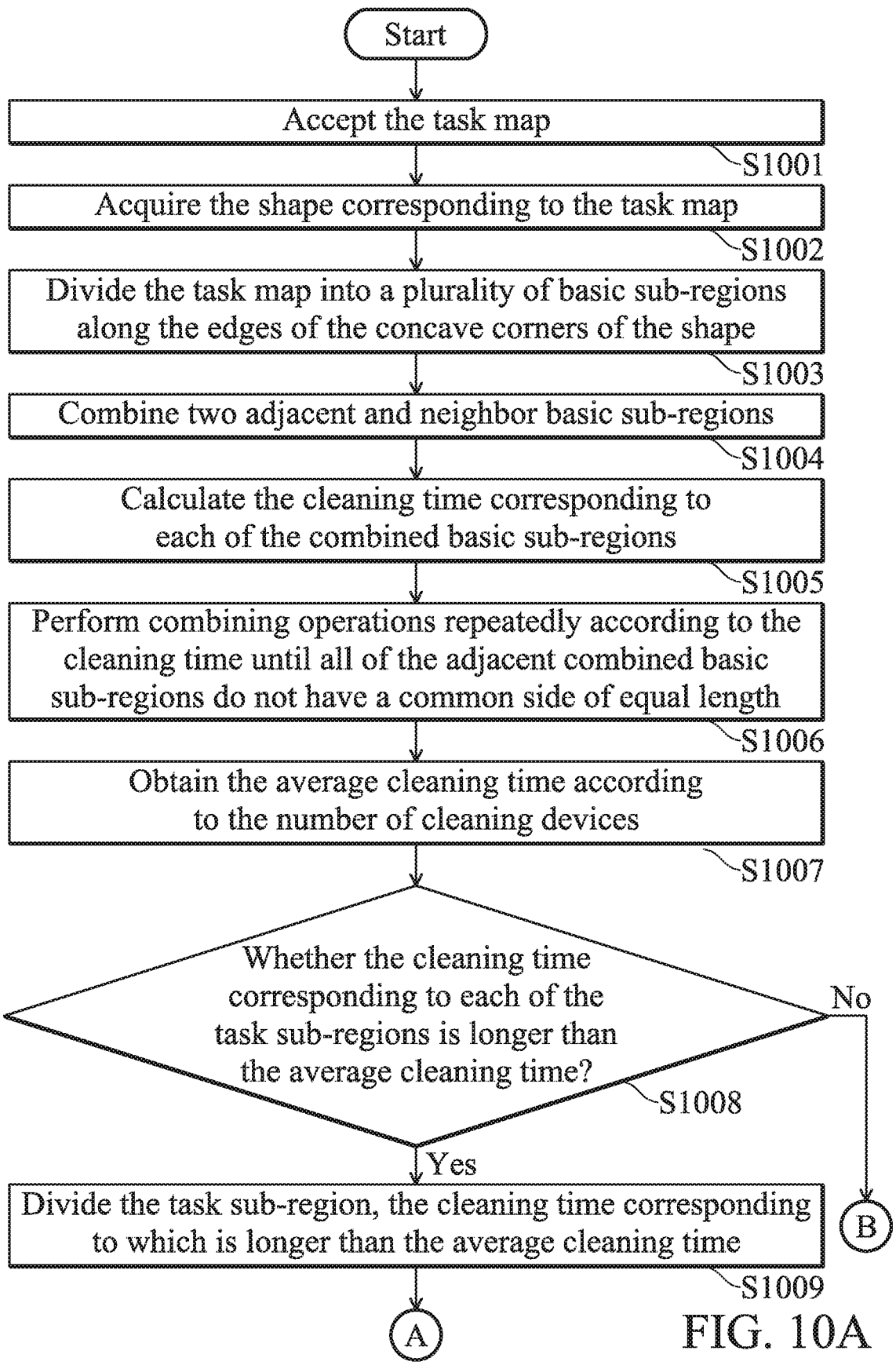
FIGS. 10A-10C are schematic diagrams of the method of distributing task regions for cleaning devices, in accordance with an embodiment of the present disclosure.
Figure 10B:
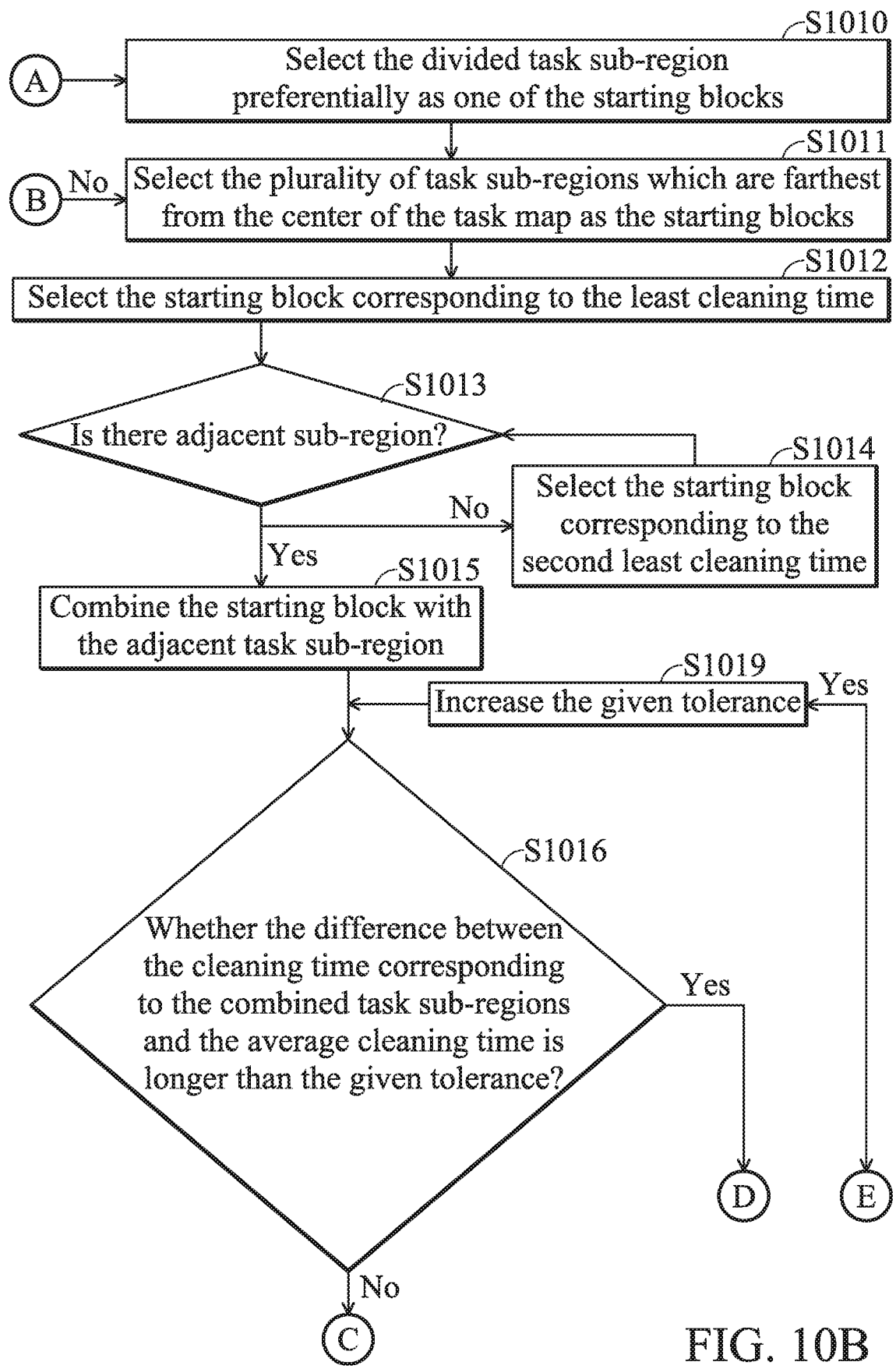
Figure 10C:
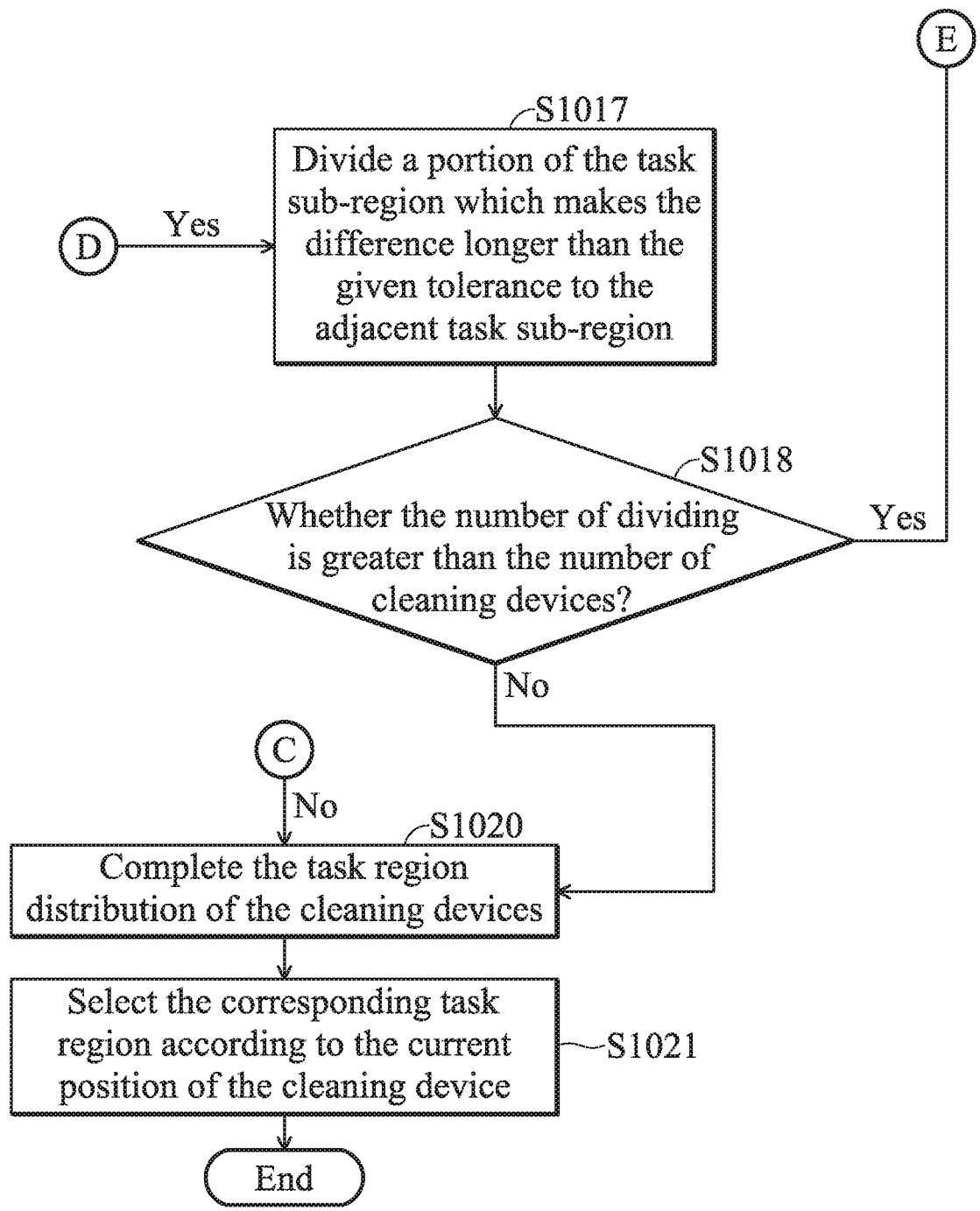

The flow chart of the method of distributing task regions for cleaning devices is shown in FIGS. 10A-10C, in accordance with one embodiment of the present disclosure. First, in step S1001, the first processing unit 111 accesses the task map from the first storage unit 112. In step S1002, the first processing unit 111 acquires the shape corresponding to the task map. In step S1003, the first processing unit 111 divides the task map into a plurality of basic sub-regions along the edges of the concave corners of the shape. In step S1004, the first processing unit 111 respectively combines two adjacent and neighbor basic sub-regions, and respectively obtains a plurality of combining results corresponding to a plurality of operations for combining the basic sub-regions. Two basic sub-regions which are combined have a common side of equal length. In step S1005, the first processing unit 111 further calculates the cleaning time corresponding to each of the combined basic sub-regions. In step S1006, the first processing unit 111 performs combining operations repeatedly according to the cleaning time until all of the adjacent combined basic sub-regions do not have a common side of equal length, and obtains the basic partition results. These combined basic sub-regions are called task sub-regions. In step S1007, the first processing unit 111 adds the cleaning time corresponding to all the task sub-regions in the basic partition result, and divides the number of cleaning devices to obtain the average cleaning time. In step S1008, the first processing unit 111 determines whether the cleaning time corresponding to each of the task sub-regions is longer than the average cleaning time. In response to the cleaning time corresponding to any one of the task sub-regions being longer than the average cleaning time, the method proceeds to step S1009. In step S1009, the first processing unit 111 divides the task sub-region, the cleaning time corresponding to which is longer than the average cleaning time, into two task sub-regions such that the cleaning time of these two task sub-regions are less than the average cleaning time, and the first processing unit 111 tries to make the cleaning time of these two task sub-regions as close as possible to the average cleaning time. In step S1010, the first processing unit 111 preferentially selects the divided task sub-region as one of the starting blocks.

In contrast, in response to the cleaning time corresponding to all of the sub-regions not being longer than the average cleaning time, the method proceeds to step S1011. In step S1011, the first processing unit 111 selects the plurality of task sub-regions which are farthest from the center of the task map as the starting blocks. The number of starting blocks is equal to the number of cleaning devices. In step S1012, the first processing unit 111 selects the starting block corresponding to the least cleaning time to combine with other task sub-regions. In step S1013, the first processing unit 111 first determines whether the starting block to be combined with other task sub-regions has the adjacent task sub-region. In response to the starting block with the least cleaning time having no adjacent task sub-region, the method proceeds to step S1104. In step S1014, the first processing unit 111 selects the starting block corresponding to the second least cleaning time, and returns to step S1013. After returning to step S1013, the first processing unit 111 determines again whether the starting block corresponding to the second least cleaning time has the adjacent task sub-region.

In contrast, in response to the starting block with the least cleaning time having the adjacent task sub-region, the method proceeds to step S1105. In step S1015, the first processing unit 111 combines the starting block with the adjacent task sub-region, and again selects the starting block with the least cleaning time to repeatedly perform the combining operations until there are no task sub-regions which have not been combined with the starting blocks. In step S1016, the first processing unit 111 determines whether the difference between the cleaning time corresponding to the combined task sub-regions and the average cleaning time is longer than the given tolerance. In response to the differences between the cleaning time corresponding to the combined task sub-regions and the average cleaning time being longer than the given tolerance, the method proceeds to step S1017. In step S1017, in order to make the cleaning time corresponding to each of the task sub-regions approach the average cleaning time, the first processing unit 111 divides a portion of the task sub-region and gives the portion to the adjacent task sub-region because the task sub-region being divided makes the difference longer than the given tolerance. For example, referring to FIGS. 7A and 7B, the first processing unit 111 combines the task sub-region 703 with the task sub-region 701 as the second combining result. Since the difference between the cleaning time (32.6 seconds) corresponding to the second combining result and the average cleaning time (26 seconds) is much longer than the given tolerance, the first processing unit 111 will divide the task sub-region 703 to make the cleaning time corresponding to the second combining result approach the average cleaning time. The first processing unit 111 divides the task sub-region 703 into the task sub-region 703a, 703b. Then the first processing unit 111 combines the task sub-region 703a with the task sub-region 701 to be the third combining result and combines the task sub-region 703b with the task sub-region 702 to be the forth combining result. The cleaning time corresponding to the third combining result is 26.8 seconds and the cleaning time corresponding to the forth combining result is 27.1 seconds, and the difference between the two and the average cleaning time are less than the given tolerance. Therefore, the first processing unit 111 sets the two as the task regions corresponding to the two cleaning devices.

However, in step S1018, the first processing unit 111 further determines whether the number of dividing is greater than the number of cleaning devices. In response to the number of divisions being more than the number of cleaning devices (i.e. each of the combined task sub-regions has been cut), the method proceeds to step S1019. At step S1019, the first processing unit 111 increases the given tolerance, and returns to step S1016. After returning to step S1016, the first processing unit 111 re-determines whether the difference between the cleaning time corresponding to each of the combined task sub-regions and the average cleaning time is longer than the given tolerance. In response to the differences between the cleaning time corresponding to each of the task sub-regions or the combined task sub-regions and the average cleaning time being less than the given tolerance, the method proceeds to step S1020. In step S1020, the first processing unit 111 completes the task region distribution of the cleaning devices. Finally, the method proceeds to step S1021, the first processing unit 111 selects the corresponding task region according to the current position of the cleaning device.

It is worth noting that in the above exemplary devices, although the above method has been described on the basis of a series of steps or flowcharts of blocks, the present disclosure is not limited to the order of the steps, and some steps may be performed in a different order than the remaining steps or the remaining steps may be performed simultaneously. In addition, those skilled in the art will understand that the steps shown in the flowcharts are not exclusive, they may include other steps of the flowchart, or one or more steps may be deleted without impacting the scope of the present disclosure.

The method of the present disclosure, or the particular version or portion thereof, may exist in the form of the code. The code may be included in a physical medium such as a floppy disk, a CD, a hard disk, or any other machine readable (such as computer readable) storage medium, or is not limited to the external forms of computer program products. When the code is loaded and performed by a machine, such as a computer, the machine becomes a device for participating in the present disclosure. The code may also be transmitted via some transmission medium such as wires or cables, fiber optics, or any transmission type. When the code is received, loaded and executed by a machine, such as a computer, the machine becomes a device for participating in the present disclosure. When implemented in a general purpose processing unit, the code combination processing unit provides a unique device which is operated similar to the application specific logic.

In summary, when the cleaning devices receive the task map with inconsistent shape, the method of distributing task regions for the cleaning devices according to the present disclosure can efficiently divide the task map into a plurality of task sub-regions to efficiently increase the efficiency of cleaning. In addition, by further dividing and combining the task sub-regions to average the cleaning time corresponding to each of the task sub-regions, the cleaning efficiency can be maximized with a plurality of the cleaning devices.

The foregoing outlines features of several embodiments or examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments or examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of distributing task regions for a plurality of cleaning devices, comprising:
   acquiring a task map;
   acquiring a shape corresponding to the task map;
   dividing the task map into a plurality of basic sub-regions according to a plurality of concave corners of the shape;
   combining each two adjacent basic sub-regions, and calculating a basic cleaning time corresponding to each of the combined basic sub-regions, wherein each two adjacent basic sub-regions have a common side of equal length;
   combining each two adjacent basic sub-regions repeatedly according to the length of the basic cleaning time until all of the adjacent basic sub-regions don't have a common side of equal length, and obtaining a basic partition result;
   selecting a plurality of starting blocks according to positions of a plurality of task sub-regions in the basic partition result, wherein the number of starting blocks is equal to the number of cleaning devices;
   combining the plurality of task sub-regions according to a position of each of the starting blocks, a position of each of the task sub-regions, and a cleaning time corresponding to each of the task sub-regions until the number of remaining task sub-regions is equal to the number of cleaning devices, and obtaining a task region distribution result; and
   enabling each of the cleaning devices to perform a cleaning task according to positions of the plurality of cleaning devices and the task region distribution result.

2. The method of claim 1, wherein the calculation of cleaning time corresponding to the plurality of basic sub-regions and the plurality of task sub-regions further comprises:
   obtaining the cleaning time through a first formula or a second formula according to the number of cleaning units on a short side of the plurality of basic sub-regions and the plurality of task sub-regions;
   wherein when the number of cleaning units on the short side is odd, the cleaning time is calculated by the first formula, wherein the first formula is:

$$T_{total}=2XT+(XY-1)L+\sqrt{1+(Y-2)^2}*L$$

wherein when the number of cleaning units on the short side is even, the cleaning time is calculated by the second formula, wherein the second formula is:

$$T_{total}=2XT+XYL$$

where $T_{total}$ is the cleaning time, X is the number of cleaning units on the short side, Y is the number of cleaning units on a long side, T is the time required for the plurality of cleaning devices to turn, and L is the time required for the plurality of cleaning devices to clean one of the cleaning units.

3. The method of claim 1, further comprising:
   obtaining an average cleaning time according to the cleaning time corresponding to each of the task sub-regions and the number of cleaning devices; and
   combining the adjacent task sub-regions according to the length of the cleaning time corresponding to the plurality of starting blocks until the difference between the cleaning time corresponding to the combined task sub-regions and the average cleaning time is smaller than a given tolerance, and obtaining the task region distribution result.

4. The method of claim 3, further comprising:
   determining whether the cleaning time corresponding to the plurality of task sub-regions is longer than the average cleaning time; and
   dividing the plurality of task sub-regions along a long side in response to determining that the cleaning time corresponding to the plurality of task sub-regions is longer than the average cleaning time.

5. The method of claim 4, further comprising:
   dividing the combined task sub-regions in response to the plurality of task sub-regions having no adjacent and combined task sub-regions; and
   enhancing the given tolerance in response to all of the task sub-regions having been divided and the difference between each of the combined task sub-regions and the average cleaning time still being higher than the given tolerance.

6. A task distribution system for cleaning devices, comprising:
   a control terminal, comprising:
      a first storage unit for storing a task map;
      a first processing unit configured to:
         acquire the task map from the first storage unit;
         acquire a shape corresponding to the task map;
         divide the task map into a plurality of basic sub-regions according to a plurality of concave corners of the shape;
         combine each two adjacent basic sub-regions and calculate a basic cleaning time corresponding to each combination, wherein each two adjacent basic sub-regions have a common side of equal length;
         combine each two adjacent basic sub-regions repeatedly according to the length of the basic cleaning time until all of the adjacent basic sub-regions don't have a common side of equal length, and obtaining a basic partition result;
         select a plurality of starting blocks according to positions of a plurality of task sub-regions in the basic partition result, wherein the number of starting blocks is equal to the number of cleaning devices;
         combine the plurality of task sub-regions according to the position of each of the starting blocks, the position of each of the task sub-regions, and the cleaning time corresponding to each of the task sub-regions until the number of remaining task sub-regions is equal to the number of cleaning devices, and obtaining a task region distribution result;
         distributing a cleaning task to each of the cleaning devices according to the position of the cleaning devices and the task region distribution result;
   a plurality of the cleaning devices, wherein each of the cleaning devices comprises:
      a second storage unit for storing the task region distribution result; and
      a second processing unit for performing the cleaning task according to the task region distribution result.

7. The task distribution system of claim 6, wherein the first processing unit further obtains the cleaning time through a first formula or a second formula according to the basic sub-regions and the number of cleaning units on a short side;

wherein when the number of cleaning units on the short side is odd, the cleaning time is calculated by the first formula, wherein the first formula is:

$$T_{total}=2XT+(XY-1)L+\sqrt{1+(Y-2)^2}*L$$

wherein when the number of cleaning units on the short side is even, the cleaning time is calculated by the second formula, wherein the second formula is:

$$T_{total}=2XT+XYL$$

where $T_{total}$ is the cleaning time, X is the number of cleaning units on the short side, Y is the number of cleaning units on a long side, T is the time required for the plurality of cleaning devices to turn, and L is the time required for the plurality of cleaning devices to clean one of the cleaning units.

8. The task distribution system of claim 6, wherein the first processing unit is further configured to:
obtain an average cleaning time according to the cleaning time corresponding to each of the task sub-regions and the number of cleaning devices; and
combine the adjacent task sub-regions according to the length of the cleaning time corresponding to the plurality of starting blocks until the difference between the cleaning time corresponding to the combined task sub-regions and the average cleaning time is smaller than a given tolerance, and obtaining the task region distribution result.

9. The task distribution system of claim 8, wherein the first processing unit is further configured to:
determine whether the cleaning time corresponding to the plurality of task sub-regions is longer than the average cleaning time; and
divide the plurality of task sub-regions along the long side in response to determining that the cleaning time corresponding to the plurality of task sub-regions is longer than the average cleaning time.

10. The task distribution system of claim 9, wherein the first processing unit is further configured to:
divide the combined task sub-regions in response to the plurality of task sub-regions having no adjacent and combined task sub-regions; and
enhance the given tolerance in response to all of the task sub-regions having been divided and the difference between each of the combined task sub-regions and the average cleaning time still being higher than the given tolerance.

* * * * *